United States Patent
Branson et al.

(10) Patent No.: US 8,766,639 B2
(45) Date of Patent: Jul. 1, 2014

(54) PROXIMITY DETECTION METHOD AND SYSTEM

(75) Inventors: Simon Branson, Whiston (GB); Andrew Allen, Newcastle-under-Lyme (GB)

(73) Assignees: Leica Geosystems AG, Heerbrugg (CH); Cable Detection Limited, Cresswell (GB)

( * ) Notice: Subject to any disclaimer, the term of this patent is extended or adjusted under 35 U.S.C. 154(b) by 131 days.

(21) Appl. No.: 13/376,573

(22) PCT Filed: Jul. 15, 2010

(86) PCT No.: PCT/EP2010/060259
§ 371 (c)(1), (2), (4) Date: Dec. 6, 2011

(87) PCT Pub. No.: WO2011/009808
PCT Pub. Date: Jan. 27, 2011

(65) Prior Publication Data
US 2012/0074945 A1    Mar. 29, 2012

(30) Foreign Application Priority Data
Jul. 22, 2009   (EP) .................................... 09166139

(51) Int. Cl.
*G01V 3/12* (2006.01)

(52) U.S. Cl.
USPC ............ 324/329; 324/323; 324/326; 324/345

(58) Field of Classification Search
USPC ........ 324/66–67, 326, 329, 262, 260; 37/348, 37/195; 364/560, 561; 414/694, 698, 699, 414/157, 160; 405/157, 160
See application file for complete search history.

(56) References Cited

U.S. PATENT DOCUMENTS

| | | | |
|---|---|---|---|
| 3,916,298 A * | 10/1975 | Ulrich | 324/326 |
| 4,600,356 A | 7/1986 | Bridges et al. | |
| 5,592,092 A * | 1/1997 | Mechler | 324/326 |
| 5,617,031 A | 4/1997 | Tuttle | |
| 5,649,600 A * | 7/1997 | Marsh | 172/4.5 |
| 6,437,726 B1 | 8/2002 | Price | |

(Continued)

FOREIGN PATENT DOCUMENTS

| | | |
|---|---|---|
| CN | 101273285 A | 9/2008 |
| GB | 1 340 198 A | 12/1973 |

(Continued)

OTHER PUBLICATIONS

European Search Report completed Nov. 24, 2009 as received in EP Application No. 09 16 6139.

*Primary Examiner* — Huy Q Phan
*Assistant Examiner* — Adam Clarke
(74) *Attorney, Agent, or Firm* — Maschoff Brennan

(57) ABSTRACT

The invention concerns a proximity detection of buried conductive structures before or while digging in areas being excavated. By means of the enclosed methods, devices, and setups, the ability and accuracy of the detection of underground structures, such as conduits, pipes, etc. is improved by conductively applying a current into the structure through the soil. The thereby emitted electromagnetic field is detected by a movable detection-unit over ground. According to this electromagnetic field the detection-unit can determine the proximity of the structure and issue a warning signal. This warning signal helps an operator of an earth moving machine to avoid a collision with the structure.

22 Claims, 8 Drawing Sheets

(56) References Cited

U.S. PATENT DOCUMENTS

2002/0047709 A1* 4/2002 Fling .............................. 324/326
2006/0244454 A1* 11/2006 Gard et al. .................... 324/326
2010/0207633 A1* 8/2010 Fling et al. ................... 324/326
2011/0168446 A1    7/2011 Lemenager et al.
2013/0002256 A1* 1/2013 Branson et al. .............. 324/326

FOREIGN PATENT DOCUMENTS

| | | |
|---|---|---|
| GB | 2 220 071 A | 12/1989 |
| WO | 2008/064851 A2 | 6/2008 |
| WO | 2008/064852 A2 | 6/2008 |

* cited by examiner

PROXIMITY DETECTION METHOD AND SYSTEM

FIELD OF THE INVENTION

The present invention relates generally to a proximity detection method for detecting a buried structure, such as an underground conduit or wiring system at a construction site and to a proximity detection system for such a structure as set forth in the claims.

BACKGROUND

It is quite common on construction sites to use devices for detecting underground structures before or while digging. Such structures are occurring often in form of services for supplying electricity, gas, fuel, water, or communication data among other conductive, underground structures. Although the location of most of these services is already known from a surveyor's plan of the site, their locations can have uncertainties or there could be additional services that are not mentioned therein. Often they are also simply overlooked by the operator of an earth moving machine during work.

The avoidance of damage to underground structures while digging in a trench or in areas being excavated is an important task. As damage to a service can cause serious impact and costs, these additional measurements are taken to be able to detect the proximity of such services on the site before or while excavating. Devices for this purpose are known as Cable Avoidance Tools also called CAT.

One way to locate underground services is to detect electromagnetic fields sent out by the service itself. To do this the service requires having a naturally occurring electrical signal witch emits a field that is detectable above the ground. This works well for switched on power supplies, but for example a wiring system of switched off street lights, unused or low-voltage communication cables, gas- or water-pipes can hardly be detected in this way.

In order to avoid these drawbacks, several developments were made to improve the detection and to be able to detect different types of services as well. U.S. Pat. No. 5,194,812 shows a solution for detecting hollow pipes like gas or water pipes by introducing a conductor into them—or by laying a conductor next to the service—that will function as a transmitter for electromagnetic fields. In this way also a pipe not having a naturally occurring field by itself can be detected by an electromagnetic field as indicated above. A drawback of this method is that it isn't always possible to insert such a transmitter into the pipe. Often it happens that a transmitter can not be inserted since the outlet of the service isn't accessible, far away from the site or the service is currently in use and therefore not accessible.

If the service itself is electrically conductive, another way to emanate a field can be used. U.S. Pat. No. 4,438,401 discloses a system wherein metallic services with no naturally occurring signals are directly connected to a signal-generator. In this way an electrical signal can be coupled to the service, and therefore it is possible to detect it by its electromagnetic field. For doing so the service has to be located and connected somewhere near the construction site. This can be quite a difficult task, since some services are hidden, not accessible or even live and therefore can not be connected to.

Another possibility for applying a signal to a service is to emit an electromagnetic field into the ground by a transmitting aerial. A receiving aerial picks up the signals reflected back by the underground structure and based on this information the proximity of a service is determined. U.S. Pat. No. 4,600,356, U.S. Pat. No. 5,592,092 and U.S. Pat. No. 6,437,726 show such devices that are for example mounted on the bucket of a backhoe. These systems work well for lots of metallic services, but the detection is still limited to services containing electrically conducting materials. For example, water-conduits made out of plastic are hardly detectable in this way.

It is also possible to detect underground pipes by other means than an electromagnetic field. U.S. Pat. No. 5,617,031 for example shows a detection method based on the analysis of the impedance of the ground with three ground-conducting contacts. The presence of a structure can be concluded according to the change of impedance between the contacts while dragging the contacts along the ground. The accuracy of the detection is dependent on the skills of the operator who carries out the method and is in general quite low. The measurement requires dragging of the conductive contacts along the ground. Therefore, such a device can not be used on uneven grounds or when the surface is covered, for example, by gravel or tar. It can, furthermore, not be mounted directly to an excavator to assist the operator during work.

What most of the known and used systems have in common is that the underground structures need to emit electromagnetic fields within a usable frequency range that are strong enough to be detectable above the surface.

The fields can be caused by naturally occurring electrical signals which limits the usability mostly to live power lines and some communication cables.

The method of sending out electromagnetic fields and determining the presence of a structure according to the field reflected back from the structure is limited in its performance due to the quiet low signal strength achievable by this. The alternative of externally applying a signal of desired frequency to the structure directly by conduction is often not possible.

SUMMARY

It is therefore an object of the present invention to detect structures that are not accessible and to improve the low signal strengths achievable with reflected radio signals.

Another object of the invention is to detect structures that are hardly possible to detect by any of the methods in prior art, for example, the commonly used plastic water-conduits.

A future object of the invention is to increase detectability and accuracy of detection for structures, not naturally emitting an electromagnetic field which is strong enough to be detected above ground.

Another object of the invention is to provide a proximity detection method with an increased ease of use.

These objects are achieved by realising the features of the independent claims. Features which further develop the invention in an alternative or advantageous manner are described in the dependent patent claims.

The proximity detection method according to the invention is based on the emission of electromagnetic fields from an underground structure, even if they do not emit such fields naturally. The field is emitted by an electrical current flowing along the structure. The introduction of the current is not achieved with a direct connection of a current-source to the structure nor is it based only on the often weak electromagnetic coupling of the structure and an electromagnetic field sent out by the detection-unit.

The proximity detection method for a conductive, elongate, buried structure, in particular an underground conduit or wiring system at a construction site, is executed by the steps of: generating an alternating electrical current of a desired frequency and strength by a current-source, introducing the electrical current into the structure so that an electromagnetic field is emitted by the current-carrying structure, detecting the time-variable electromagnetic field by a mobile detection-unit above ground that is electrically insulated from the ground and determining the proximity of the structure to the detection-unit according to the detected electromagnetic field.

According to the invention, at least a first and a second single point electrodes stuck into soil, so that the electrodes are surrounded by soil material and spaced approximately 5-200 meters apart from each other, are introducing the electrical current by conduction directly into the soil, such that the flow-path of the electrical current is:

from the current-source to the first electrode,
from the first electrode through soil to the structure, so that they are conducted by soil material only,
following at least a part of the structure as path of least resistance underground,
from the structure through soil to the second electrode, so that they are conducted by soil material only,
from the at least second electrode to the current-source by an insulated cable above ground,
wherein the first and the second electrode define a detection-area wherein the step of detecting the electromagnetic field is executed.

According to the invention, a current is conductively coupled into the soil on at least two sides of an area of interest. The current is introduced by electrodes connected to a current-source by a sufficiently insulated cable of appropriate length, which should be sited some distance away from the excavation area to avoid interference from the cable itself and to avoid damage to it while excavating.

The connection from the current-source to at least two single points of the soil can, for example, be established by electrodes in the form of existing drain covers, metal gate posts, street name posts or other already present soil connections. If none of these natural soil connections are available, the current can be introduced by ground-spikes such as tent pegs or similar. The electrodes have to be at least partly surrounded by soil material to be conductively connected to them. The usage of multi point soil connections such as lamp posts, long metal fences, long road barriers, gas/water manholes or valve covers should be avoided for this purpose.

Due to the fact that the conductivity of an underground structure is approximately at least a hundred times better than the connectivity of the soil, the current introduced into the soil will take a flow path of least resistance that mainly follows the underground structure.

A simple model to explain the principle is to take the soil and the structures buried therein as a set of multiple conduction paths. The impedance of the soil material is typically in the range of at least some kilo-Ohms to mega-Ohms, whereas buried structures are in the range of a few Ohms. Therefore, the majority of the introduced current will flow from the electrode—through soil material—to the buried structure and along—at least part of—the structure, emitting an electromagnetic field.

A setup like this works with all kinds of either electron- or ionic-conductive structures that are earth bound in some ways. For example water inside of plastic conduit being grounded via domestic copper pipes and therefore being connected to soil, will work according to the invention in a similar way than any pipe made of conductive material such as cast iron, copper or the like.

In order to ensure proper operation, the current-source can be equipped with a system to detect whether the current is flowing or not. The current-source preferably provides an alternating current with a frequency in the range of about 5 kHz to 300 kHz, although other frequencies can be used as well, especially to take care of certain soil conditions.

The electromagnetic field of the current is detected by a detection-unit above the ground. The detection-unit can be carried around by a worker or attached directly to an earth moving machine, such as an excavator, digger, dozer, backhoe or dredger, allowing an on-line observation of the actual working area for underground structures during labour. As the detection-unit's range of detection wherein structures are detectable moves together with the tool, damage to underground structures can be efficiently avoided while working, without the need of a previous exploration step before the work commences. A mobilisation of the detection-unit by some dedicated means such as a carriage or an autonomous robot is another option. The detection-unit does not need a conductive connection to the soil and can therefore be moved without ground contact. In general the detection-unit comprises at least some kind of aerial, coil, fluxmeter or another sensor to detect electromagnetic fields and generates an output-signal dependent on the field. A computational unit analyses the signature of these fields and generates an output dependent on them.

In one possible embodiment, the electromagnetic field is detected by two aerials or sensors that are arranged in a known distance to each other. The distance to the structure as source of the electromagnetic field can be determined according to the difference in the strength of the signals picked up by the two aerials. Thereby not only the presence of a structure, but also its proximity can be determined and for example be presented to the user of the detection-unit by optical, acoustic or haptic means or be displayed as distance—or depth—information as a value in some unit of length.

As mentioned, the distance value can be evaluated according to the difference in signal-strength at a Bottom- and Top-aerial and distance of separation between them. In the formula (A) for calculating the distance value, the "Aerial_Seperation" is the spacing between the two aerials and the variables "Bottom" respectively "Top" stand for the strength of the electromagnetic field that is picked up by the corresponding top- and bottom-aerial.

$$\text{Depth} = \frac{\text{Aerial\_Seperation}}{\left(\frac{\text{Bottom}}{\text{Top}} - 1\right)} \quad (A)$$

The described evaluation is not restricted to the usage of two aerials or sensors. For example, more aerials, maybe aligned in different orientations, and their measured signals or values can be superimposed.

The measurements, processed by a computation means, is provided to the user, e.g. by displaying the determined distance of a service on an LCD-Screen.

Beside the displaying of an exact distance value in some unit of length, it is also possible to present the distance only in rough steps such as: "NO SIGNAL", "FAR" (e.g. more than 3 m), "NEAR" (e.g. 3 m to 50 cm) or "SHALLOW" (e.g. less than 50 cm) to the user, since this information can be sufficient for some practical applications.

The detection-unit may issue a warning signal to the operator of the excavator when a structure is detected in close proximity of the detection-unit or another known reference point. An example for such a reference point is the tip of the bucket of an excavator, whereto the detection unit is fixed in a known relative position, in particular by attaching the detection unit to the arm of the excavator.

The warning signal can also contain additional information about the proximity of the structure, for example a distance from a reference point, such as the bucket of the excavator, to the structure. If the distance between the structure and the bucket is below a critical distance, a warning will be issued. The critical distance can either be defined as a fixed value, or set by the operator according to on site requirements. The warning can be issued in order to inform the operator of the fact that a structure is close to the actual working area. Alternatively, the warning can also control a locking mechanism of the excavator or parts of it in order to avoid a collision of the excavator's bucket and the structure. For the purpose described above, the detection-unit can be fixed to the excavator, for example somewhere near its bucket.

The invention further relates to a proximity detection system for a conductive, elongate, buried structure, in particular an underground conduit or wiring system at a construction site, comprising a current-source for generating an alternating electrical current of a desired frequency, a connection-set for introduction of the electrical current into the structure, in such a way that a time-variable electromagnetic field is emitted by the structure, and a mobile detection-unit above ground electrically insulated from soil, built in such a way that the electromagnetic field is detected and the proximity of the structure to the detection-unit is determined according to the electromagnetic field, characterized in that the connection-set comprises at least a first and a second ground-spike, each having an electrode to be stuck into soil so that the electrode is surrounded by soil material, and an insulated cable with a length of approximately 5-200 meters, connected to the current-source and the electrode, whereby the connection-set is built for conductively introducing the electrical current into the soil in such a way that the flow-path for the electrical current is:

from the current-source to the first electrode,
from the first electrode through soil to the conductive structure, so that they are conducted by soil material only,
following the structure as path of least resistance inside the soil,
from the structure through soil to the second electrode, so that they are conducted by soil material only,
from the second electrode back to the current-source by the cable above ground,
wherein the first and the second electrode define a detection-area within which the structure is detectable by the detection-unit.

The detection-unit can also be constructed as a mobile, hand held device that can be used to scan for services before or while digging. In this case, the worker can mark the location where a service is detected in order to avoid collision during excavation.

BRIEF DESCRIPTION OF THE DRAWINGS

The proximity detection method according to the invention and the devices and setup according to the invention are described or explained in more detail below, purely by way of example, with reference to working examples shown schematically in the drawing. Specifically.

The diagrams of the following figures should not be considered as being drawn to scale.

DETAILED DESCRIPTION

Figure 1:
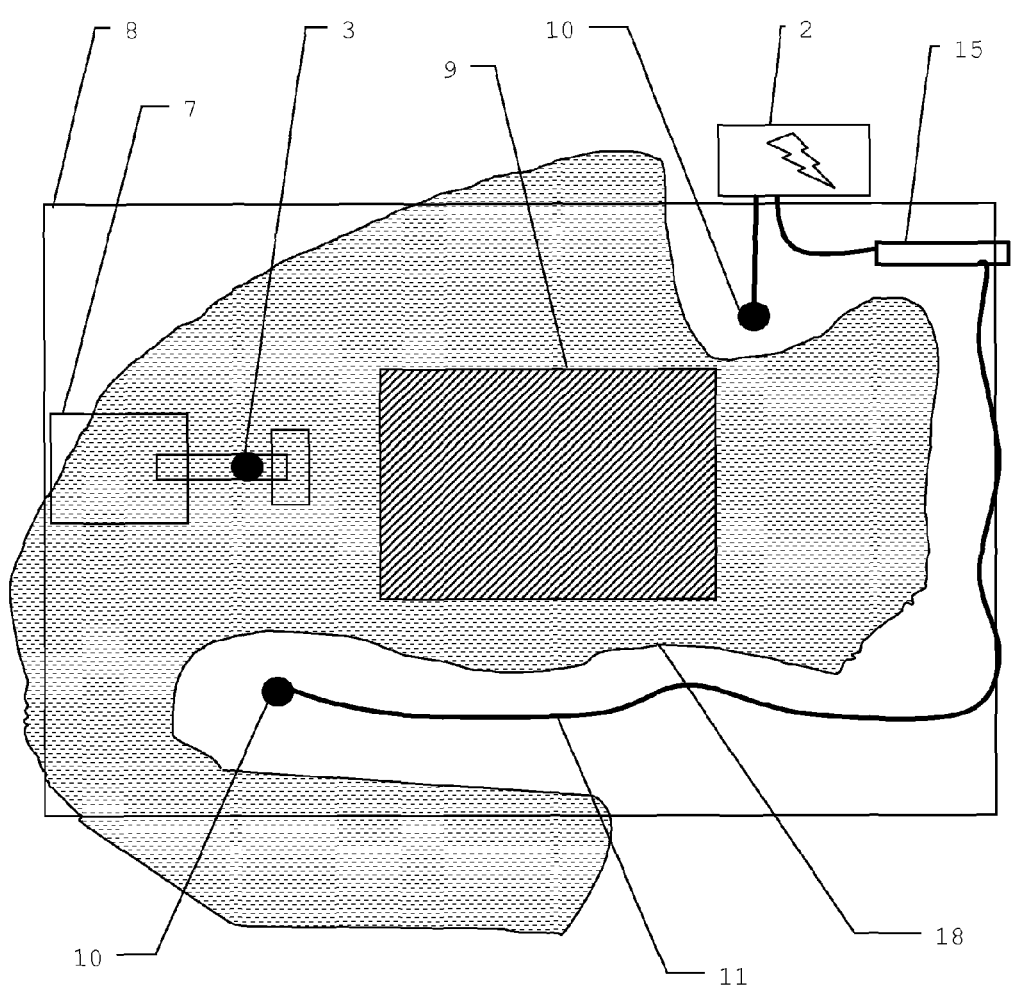
FIG. 1 shows an example of a typical setup on a construction site to execute the proximity detection method according to the invention.

FIG. 1 shows an example of a setup on a construction site 8 to execute the proximity detection method according to the invention. An excavation-area 9 is shown that has to be excavated by an earth moving machine 7, such as the shown excavator. The detection-area 18, in which conductive buried structures 1 can be detected by a detection-unit sensitive for electromagnetic fields, is defined by the locations where the electrodes 10 are stuck into ground, and particularly also by the location of current source 2 and the cable 11. Further, the location and direction of the structures 1, as well as ground conditions and other obstacles on or close to the site 8, such as buildings or machinery, influences the actual size and shape of the detection-area 18. In this example, the excavation-area 9 is inside of the detection-area 18 in particular in between the electrodes 10. Attached to the excavator 7, there is a detection-unit 3. Outside of the excavation-area 9, there is a current-source 2 that is connected with two single point, soil conducting electrodes 10 such as earth-spikes 19 pushed into the ground. They are connected with the current-source 2 by a cable 11 that is, for example, provided by a cable reel 15. The electrodes 10 for introducing the current are thereby built as metallic ground-spikes 19, stuck into the soil 12, so that they are at least partly surrounded by soil material and therefore electrically connected to it.

In this example the buried structures 1 to be detected are underground services like pipes and conduits. For good detection results, the electrodes 10 are spaced about 5-200 meters apart from each other. Best detection results can be achieved if they are more or less in line to the direction of the services, if known or assumed. Also other setups, where the services are aligned somehow inside the detection-area 18, have proven to result in good detection. In general, cable 11 should be routed at least 2-5 meters away from the desired detection-area 18 to avoid unwanted interference from the cable 11 itself or damage to it by the excavator 7.

On site testing confirmed good results with an electrode distance of about 20-100 meters. The detection-area 18 can in general be described as a more or less elliptic area, defined by the electrodes in focus and about 50-200 meters in diameter, avoiding the area in about 2-5 meters distance directly around the electrodes 10, current-source 2 and the cable 11 themselves. Of course variations of the setups are possible, according to the characteristics of the site 8 such as the size of the site 8, desired detection-area 18, condition and structure of the soil material, direction and count of the services 1, conductivity of the services 1, availability of natural electrodes 10, and many more.

The mobile detection-unit 3 for detecting the electromagnetic field 4 and determining the proximity of the structure 1 can for example comprise two sensors for the detection of electromagnetic fields, spaced apart in a known distance, whereby the proximity of the source of the electromagnetic field, in particular the electromagnetic field 4 emitted by the current 5 flowing along the structure 1, can be determined, according to the differences of the detected fields at the two sensors. The detection-unit 3 can for example be built as known from WO2008/064851 or WO2008/064852.

Figure 2:
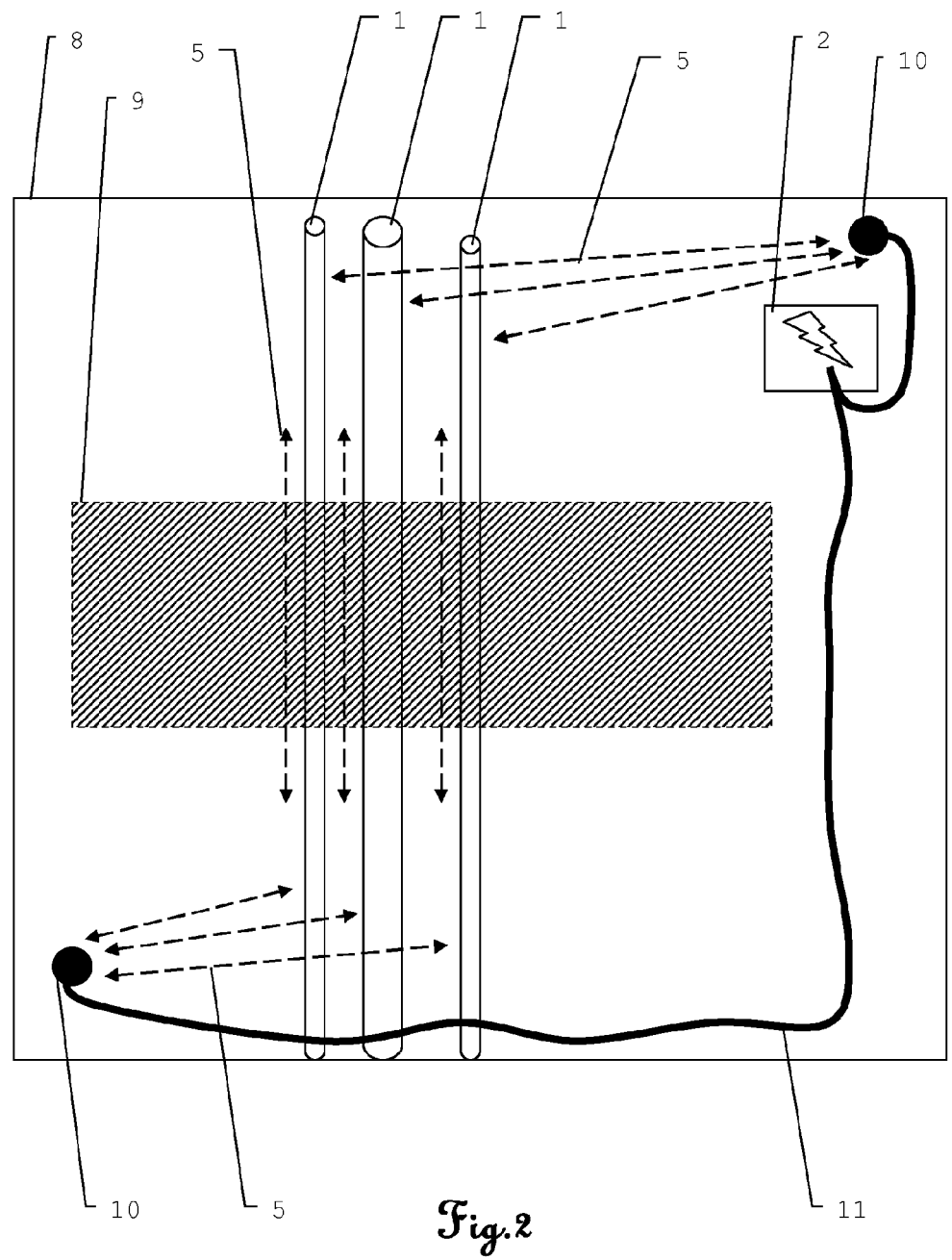
FIG. 2 schematically shows the flow of the current according to the invention in a bird's eye

FIG. 2 shows the flow of the current 5 according to the invention in more detail. Again, the electrodes 10, the current-source 2 and the cable 11 are placed in some distance outside of the excavation-area 9 on the site 8. Practical experiments have shown that in general a distance of about 10 meters from the excavation-area 9 to the electrodes is an appropriate value and that a distance of the electrodes 10 to each other in the range of 50-100 meter allows good detection results. The areas directly around the electrodes 10, the current-source 2 and the cable 11 within a distance of about at least 2 meters, in particular 5 meters, more in particular 10 meters, should be avoided because of interferences with the electromagnetic field emitted by them.

The excavation-area 9 comprises some structures 1 buried in the soil, for example gas pipes of cast iron, earth bounded power or communication lines or water conduits made either of cast iron, copper or plastic. Since the earth bounded structures 1 have a much higher conductivity than the surrounding soil 12, which can comprise clay, rock sand and moisture, the on both sides directly in to soil material introduced current 5 takes the way of least resistance which is along—at least part of—the structure. In the figures, the direction of the current 5—introduced by the electrodes 10—is symbolically shown by arrows nearby the flow-path of the current.

The strength of the current 5 is observed by the current-source 2, which can indicate the flow of the current 5 along the path by a signal. If no or not enough current is flowing, another type or position of the electrodes 10 has to be chosen. Therefore, the current-source can be equipped with a system to detect whether the electrical current is flowing along the flow-path with a desired strength or not which will be indicated to the user of the proximity detection system.

The method is not limited to the detection of a single underground structure 1. In case of more than one structure 1 the current 5 will split up between the structures 1. The only limitation is that there has to be sufficient current 5 along each of the structures 1 for the method to detect all of them. Experiments on an example setup have shown that a current strength of about 4 mA makes a structure 1 in about one meter depth sufficiently detectable. As a special example, the detection of five underground structures 1—buried in more or less parallel direction, having nearly the same conductivity—in about one meter depth would therefore require least 20 mA of current from the current-source 2.

The current-source 2 is, for example, providing an alternating current 5, having a frequency the range of about 5 kHz to 300 kHz, in particular about 8 or 33 kHz, although other frequencies can be chosen to take care of certain soil conditions.

Figure 3:
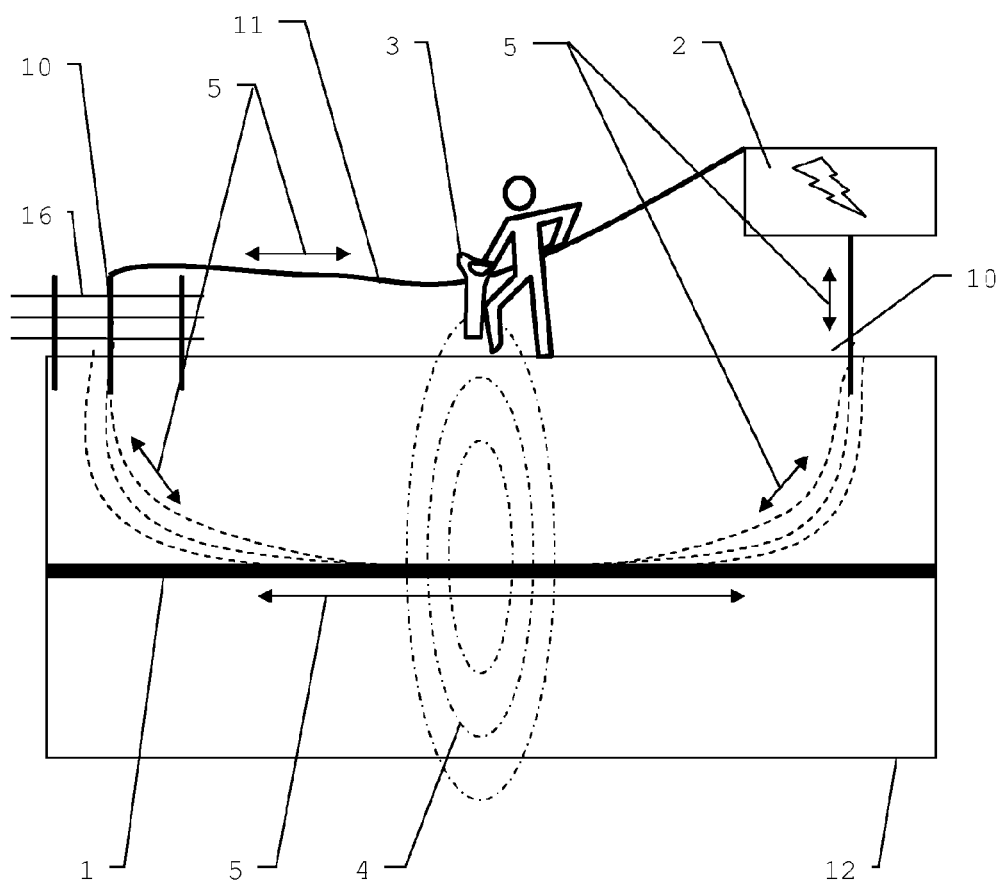
FIG. 3 shows the flow of the current and the thereby emitted electromagnetic field and its detection by a handheld detection-unit according to the invention, in a cross section of the ground.

FIG. 3 shows, in a cross-section view, how the current 5 generated by the current-source 2 is introduced into the soil 12 by the electrodes 10. In this example a conductive post of a fence 16 is connected to the cable 11 to be used as one electrode 10. The current 5 is introduced to the buried structure 1 as described above. The thereby emitted electromagnetic field 4 is detected by the detection-unit 3 sited above the soil 12. This example shows a hand held detection unit, carried by a worker. With this setup the worker can mark the positions of the underground services.

A craftsman is carrying a detection-unit 3 to scan the area of detection wherefore he has to move the detection-unit 3 over the detection area 18. A commonly used practice when doing so is trying to follow the path of a structure once it has been detected by swinging the detection unit to and from and walking in the direction of the closest proximity or lowest distance-value measured. This detected path of the underground structure can be marked on the surface e.g. by poles, paint, chalk, ribbons or the like, whereby not only the path can be marked, but also the proximity as information of depth of the service can be noted.

Figure 4:
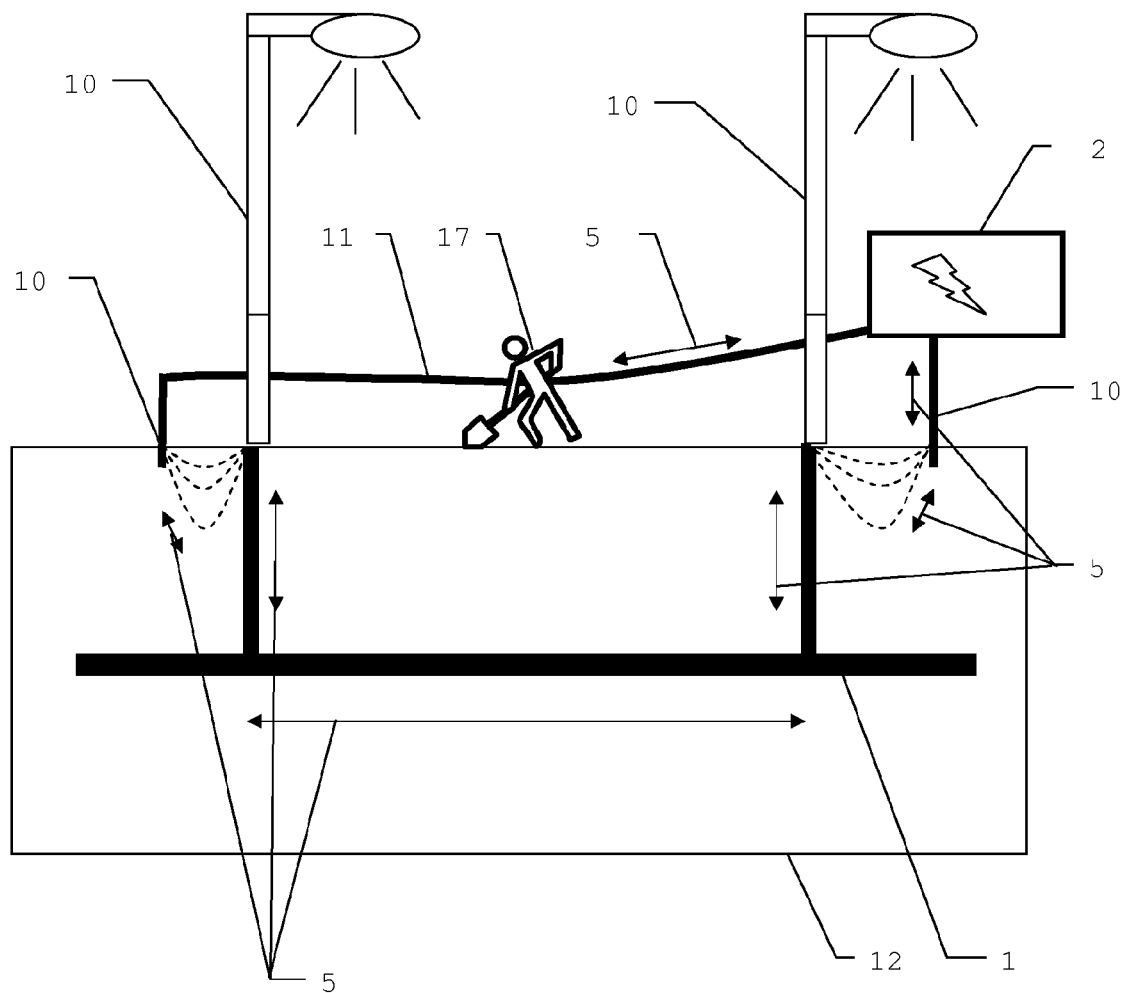
FIG. 4 shows a working example of the setup for the proximity detection method and the flow of the current according to the invention to avoid a collision with underground wiring of street lights while digging.

FIG. 4 shows a construction site 8 where it is known that there has to be a structure 1 in form of an electrical wiring system for connecting the streetlights 14 somewhere underground, but the actual location of it is not known. Therefore, a setup according to the invention is used, comprising the current-source 2, a long cable 11 and two electrodes 10 connected to the ground in some distance on each side of the streetlights 14. The current 5 will take the path of least resistance inside the soil 12 that is, in this case, the structure 1 connecting the two streetlights 14. The excavator 7 can therefore use a detection-unit 3 fixed to it, in order to locate the structure 1 while digging and avoid collision and damage to it.

Figure 5:
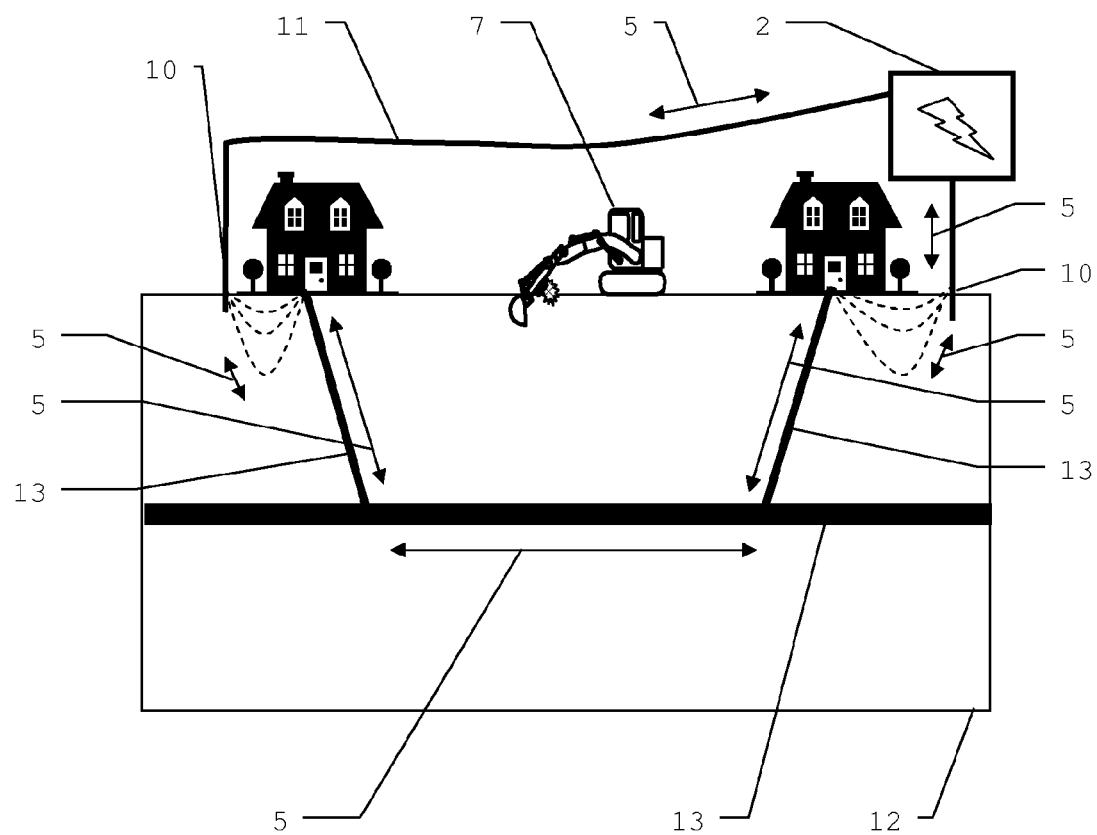
FIG. 5 shows working examples of the proximity detection method according to the invention to avoid a collision of an excavator with a plastic water conduit while digging.

In FIG. 5, there is a task similar to the one of FIG. 4 but in this case structure 1 comprises a plastic water conduit that has to be avoided. Since the water conduit is attached to earth bounded, domestic copper pipes on both sides, the water inside the conduit can act as a conduction path. Therefore, a similar approach as shown and described in FIG. 4 can be used to also avoid an impact with this kind of structure 1 that would otherwise be quite hard to detect accurately.

Figure 6:
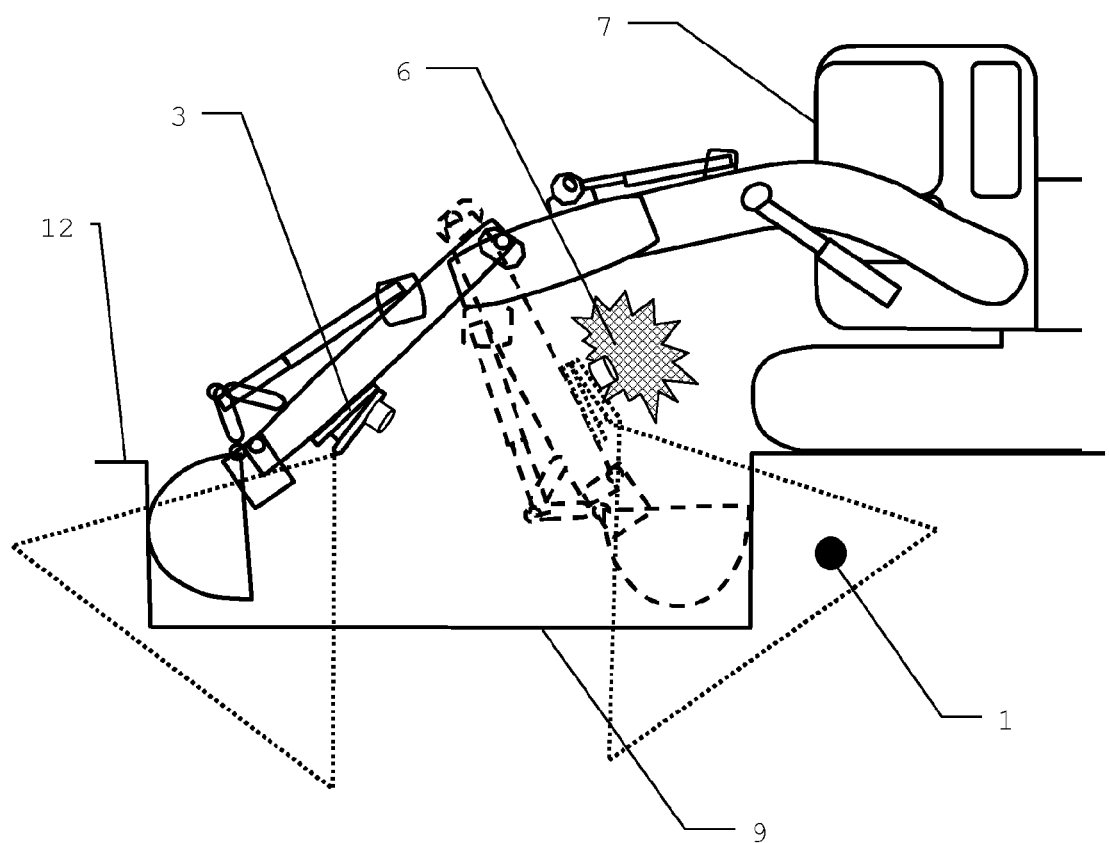
FIG. 6 shows a working example of the proximity detection method according to the invention where the detection-unit is mounted directly on an excavator to issue a warning signal in case of a structure, such as an underground pipe being proximate to the bucket of the excavator.

FIG. 6 shows a close-up view of an excavator 7 equipped with a detection-unit 3 according to the invention. The structure 1 buried in the soil 12 guides the current 5 introduced, as described in detail above. If, as drawn in broken lines, the structure 1 gets in to the range of the detection-unit 3 marked by dotted lines, a warning signal 6 alerts the operator of the proximity of the structure. In this way the operator can carry on his work with extreme caution or start to work the section around the structure 1 by hand in order to avoid damage to the structure. In addition to the current 5 introduced through the soil as described above, the detection unit can also be built to emit an electromagnetic field and detect whether a part of it is reflected back by the underground structure 1 to make conclusions about the presence of the structure 1. Further it can also detect electromagnetic fields that are emitted by the structure 1 naturally by its usage. The combination of natural, reflected and introduced electromagnetic fields can help to further improve the accuracy of the detection.

Figure 7:
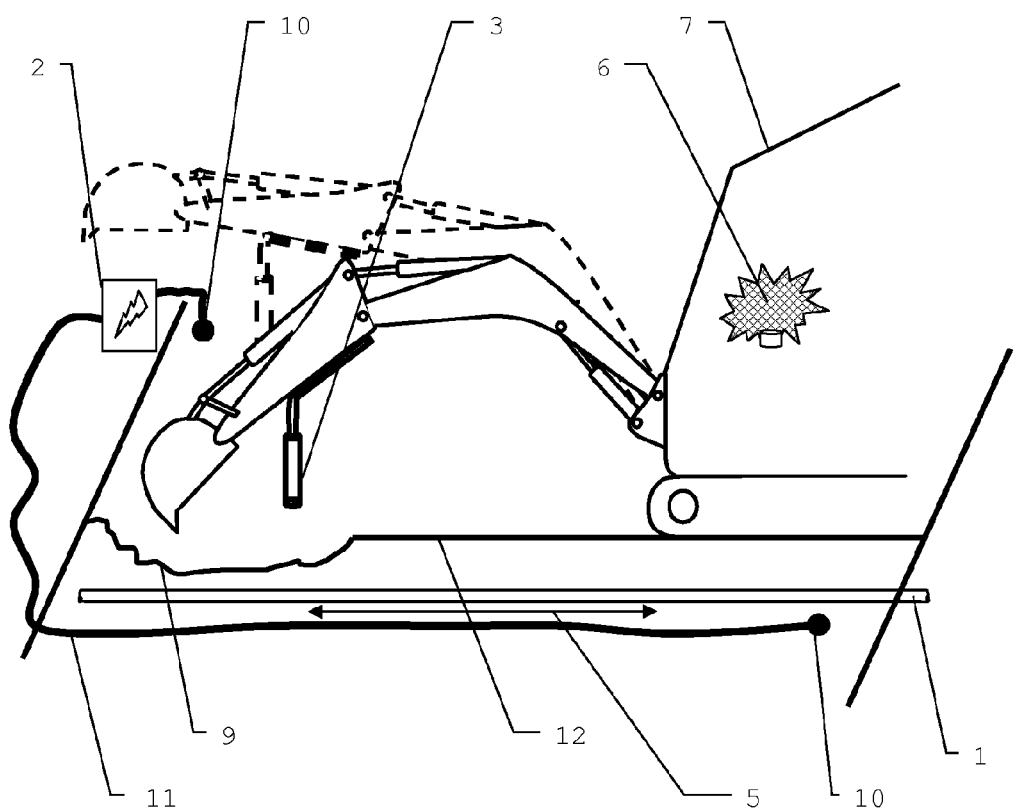
FIG. 7 shows a working example of the proximity detection method with the detection-unit mounted on an excavator and an example of the setup on site according to the invention.

FIG. 7 shows another example for the usage of the proximity detection method according to the invention. A current 5 generated by the current-source 2 is introduced into the soil 12, wherein it mainly flows along the path of least resistance in-between the at least two electrodes 10 connected by the cable 11. The excavator 7 is equipped with a detection-unit 3. If the electromagnetic field of the current inside the structure 1 is detected underneath the detection-unit 3 in the excavation-area 9 while digging, the warning signal 6 is issued. Such a warning 6 can, for example, be an optical, acoustic, or haptic signal to the operator as well as an electrical signal that can, for example, be used to disable the excavator 7 or parts of it.

Figure 8:
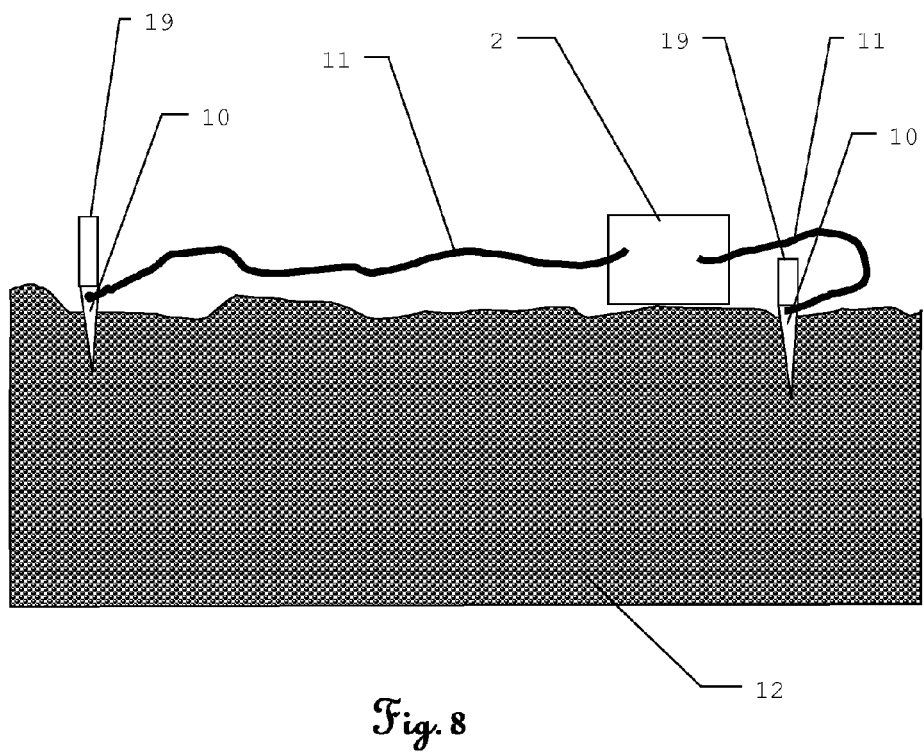
FIG. 8 shows an example of the connection-set that introduces the current into the soil by two ground-spikes.

FIG. 8 shows an example of the connection-set that introduces the current 5 from the current source 2 into the soil 12. In this case, two ground-spikes 19 that comprise the electrodes 10 are stuck into ground to a depth of at least 10 cm for establishing a conductive connection between the electrodes 10 and the soil-material. In this way a conductive flow-path for the current 5 is established from the current-source 2 via the cable 11 and the electrode 10 into the soil material.

What is claimed is:

1. A proximity detection method for a conductive, buried structure, comprising the steps of:
    generating an alternating electrical current of a desired frequency by a current-source;
    introducing the electrical current into the structure so that an electromagnetic field is emitted, by the current-carrying structure;
    detecting the time-variable electromagnetic field by a mobile detection-unit above ground that is electrically insulated from the ground;
    determining the proximity of the structure to the detection-unit according to the detected electromagnetic field;
    indicating the proximity as a distance information between the structure and a reference point with a known position relative to the detection-unit, wherein at least first and second single point electrodes are stuck into soil so that the electrodes are surrounded by soil material, are spaced approximately 5-200 meters apart from each other, and are introducing the electrical current by conduction directly into the soil such that the flow-path of the electrical current is:
        from the current-source to the first electrode;
        from the first electrode through soil to the structure so that they are conducted by soil material only;
        following at least a part of the structure as path of least resistance underground;
        from the structure through soil to the second electrode so that they are conducted by soil material only; and
        from the at least second electrode to the current-source by an insulated cable above ground, wherein the first and the second electrode define a detection-area wherein the step of detecting the electromagnetic field is executed,
    and wherein the current-source is equipped with a system to detect whether the electrical current is flowing along the flow-path with a desired strength.

2. A proximity detection method according to claim 1, wherein:
    the step of detecting is carried out in an excavation-area being excavated by an earth moving machine, digger or dozer, or by hand, whereby the detection-unit is constructed as a hand held device, to be carried around by a worker and to be moved without ground contact.

3. A proximity detection method according to claim 2, wherein the step of determining the proximity is carried out by determining a distance between the structure and a reference point whereof a position relative to the detection-unit is known and an additional step of issuing a warning if the distance is below a critical distance.

4. A proximity detection method according to claim 3, wherein the warning contains information about the actual distance between the reference point and the structure.

5. A proximity detection method according to claim 3, wherein the step of issuing a warning is carried out by issuing an optical, acoustic or haptic warning.

6. A proximity detection method according to claim 2, wherein the step of determining the proximity is carried out by determining a distance between the structure and a reference point being a tip of a bucket of the earth moving machine, whereof a position relative to the detection-unit is known and the additional step of issuing a warning if the distance is below a critical distance.

7. A proximity detection method according to claim 1, wherein:
    the step of detecting is carried out in an excavation-area being excavated by an earth moving machine, an excavator, digger or dozer, or by hand, whereby the detection-unit is fixed to the earth moving machine.

8. A proximity detection method according to claim 7, wherein the step of detecting the electromagnetic field is carried out by determining the proximity of the structure as the source of the electromagnetic field according to the difference of the detected fields at the two sensors as distance information.

9. A proximity detection method according to claim 1, wherein:
    the step of detecting the electromagnetic field is carried out by at least two sensors for electromagnetic fields, spaced apart in a known distance to each other, generating an output-signal dependent on the sensed electromagnetic field, an aerial, coil, fluxmeter or another sensor for magnetic fields, and a computation unit analyzing the output-signals from the at least two sensors.

10. A proximity detection method according to claim 1, wherein the step of detecting also comprises the detection of an electromagnetic field emitted by a current naturally occurring on the structure by its usage, in addition to the electromagnetic field emitted by the introduced electrical current.

11. A proximity detection method according to claim 1, further comprising the additional steps of:
    transmitting electromagnetic fields towards the structure; and
    detecting parts of the transmitted electromagnetic field reflected back by the structure, in addition to the electromagnetic field emitted by the introduced electrical current.

12. A proximity detection method according to claim 1, wherein the step of generating the electrical current is carried out with a frequency in the range of 5-300 kHz.

13. A proximity detection method according to claim 1, wherein the step of generating the electrical current is carried out with a frequency of 33 kHz.

14. A proximity detection method according to claim 1, wherein the electrodes are formed by metallic ground-spikes or metal poles.

15. A proximity detection method according to claim 1, wherein the step of introducing the current into the soil by the electrodes is carried out by placing the electrodes to be more or less in line to a direction of the elongate structure, if the direction of the elongate structure is known or assumed.

16. A proximity detection method according to claim 1, wherein the detection-area is defined as an elliptic with the electrodes in focus, except the areas directly around the electrodes, the current source and the cable within a distance of 2-10 meters.

17. A proximity detection method according to claim 1, wherein the detection-area is defined as an elliptic with the electrodes in focus, except the areas directly around the electrodes, the current source and the cable within a distance of 5 meters.

18. A proximity detection method according to claim 1, wherein the buried structure includes an underground conduit or wiring system at a construction site.

19. A proximity detection method according to claim 1, wherein the system to detect whether the electrical current is flowing along the flow-path with a desired strength detects whether the desired strength is sufficient to detect the structure.

20. A proximity detection system for a conductive, elongate, buried structure, comprising:
- a current-source for generating an alternating electrical current of a desired frequency;
- a connection-set for introduction of the electrical current into the structure, in such a way that a time-variable electromagnetic field is emitted by the structure;
- a mobile detection-unit above ground electrically insulated from soil, built in such a way that the electromagnetic field is detected and the proximity of the structure to the detection-unit is determined according to the electromagnetic field and the proximity is indicated as a distance information between the structure and a reference point of which a position relative to the detection-unit is known, wherein the connection-set comprises:
  - at least a first and a second ground-spike, each having an electrode to be stuck into soil so that the electrode is surrounded by soil material, and
  - an insulated cable with a length of approximately 5-200 meters, connected to the current-source and the electrode,
- whereby the connection-set is built in a way for conductively introducing the electrical current into soil in such a way that the flow-path of the electrical current is:
  - from the current-source to the first electrode;
  - from the first electrode through soil to the conductive structure, so that they are conducted by soil material only;
  - following the structure as path of least resistance inside the soil;
  - from the structure through soil to the second electrode, so that they are conducted by soil material only; and
  - from the second electrode back to the current-source by the cable above ground, wherein the first and the second electrode define a detection-area within which the structure is detectable by the detection-unit, and
- wherein the current-source is equipped with a system to detect whether the electrical current is flowing along the flow-path with a desired strength.

21. A proximity detection system according to claim 20, wherein the buried structure includes an underground conduit or wiring system at a construction site.

22. A proximity detection system according to claim 20, wherein the system to detect whether the electrical current is flowing along the flow-path with a desired strength is configured to detect whether the desired strength is sufficient to detect the structure.

* * * * *